United States Patent
Balasubramanian

(10) Patent No.: US 9,745,064 B2
(45) Date of Patent: Aug. 29, 2017

(54) AIRCRAFT OVERHEAD BIN MONITORING AND ALERT SYSTEM

(71) Applicant: Goodrich Corporation, Charlotte, NC (US)

(72) Inventor: Rameshkumar Balasubramanian, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/064,834

(22) Filed: Mar. 9, 2016

(65) Prior Publication Data
US 2017/0152044 A1    Jun. 1, 2017

(51) Int. Cl.
| | |
|---|---|
| *B64F 5/00* | (2017.01) |
| *B64D 11/00* | (2006.01) |
| *B64D 45/00* | (2006.01) |

(52) U.S. Cl.
CPC ........ *B64D 11/003* (2013.01); *B64D 45/0005* (2013.01); *B64D 2045/007* (2013.01)

(58) Field of Classification Search
None
See application file for complete search history.

(56) References Cited

U.S. PATENT DOCUMENTS

| | | | | |
|---|---|---|---|---|
| 6,318,671 | B1 * | 11/2001 | Schumacher | B64D 11/003 244/118.5 |
| 6,598,829 | B2 * | 7/2003 | Kamstra | B64D 11/003 244/118.1 |
| 6,899,299 | B2 * | 5/2005 | Ritts | B64D 11/003 244/118.5 |
| 7,151,350 | B2 * | 12/2006 | Haag | G01S 13/04 318/280 |
| 7,302,150 | B2 * | 11/2007 | Druckman | B64D 11/003 385/134 |
| 7,499,802 | B2 * | 3/2009 | Mishima | G06Q 10/025 340/539.13 |
| 7,552,954 | B2 * | 6/2009 | Rozo | E05B 5/00 292/143 |
| 7,937,169 | B2 * | 5/2011 | Kneller | B64D 11/003 244/118.1 |

(Continued)

FOREIGN PATENT DOCUMENTS

| | | |
|---|---|---|
| EP | 0348130 A2 | 6/1994 |
| WO | 9943545 A1 | 9/1999 |

*Primary Examiner* — Rami Khatib
*Assistant Examiner* — Nicholas K Wiltey
(74) *Attorney, Agent, or Firm* — Cantor Colburn LLP

(57) ABSTRACT

A system for monitoring an overhead storage bin includes a proximity sensor, a load sensor, a latch mechanism sensor, and a controller operatively connected to the proximity sensor, the load sensor and the latch mechanism sensor. The controller is configured to retrieve proximity data from the proximity sensor indicative of a space status of an overhead storage bin, retrieve load data from the load sensor indicative of a stowage weight status of the bin, and retrieve a latch status from the latch mechanism indicative of a latch status of an access door of the bin. The controller is further configured to determine, based on the space status, the weight data, and the latch status, a probability indicative of whether an item stowed in the bin may fall from the bin, and output, based on the probability, an indication on an output device on an exterior surface of the bin.

20 Claims, 8 Drawing Sheets

(56) References Cited

U.S. PATENT DOCUMENTS

| | | | |
|---|---|---|---|
| 8,028,957 B2 | 10/2011 | Wolf et al. | |
| 8,038,098 B2 | 10/2011 | Johnson et al. | |
| 8,631,697 B2 * | 1/2014 | Di Giugno | B65F 1/06 73/304 C |
| 9,327,834 B2 * | 5/2016 | Paulino | B64D 11/003 |
| 2001/0010541 A1 * | 8/2001 | Fernandez | G08B 13/19608 348/143 |
| 2005/0082859 A1 * | 4/2005 | Walter | B60R 21/06 296/24.4 |
| 2005/0218264 A1 * | 10/2005 | Graf | B64D 11/003 244/118.1 |
| 2006/0161345 A1 * | 7/2006 | Mishima | G06Q 10/025 701/34.4 |
| 2008/0071398 A1 * | 3/2008 | Kneller | B64D 11/003 700/83 |
| 2008/0078869 A1 * | 4/2008 | Kneller | B64D 11/003 244/118.5 |
| 2008/0078871 A1 | 4/2008 | Munson et al. | |
| 2008/0251640 A1 * | 10/2008 | Johnson | B64D 11/003 244/118.1 |
| 2008/0295407 A1 * | 12/2008 | Von Wieding | G05G 15/08 49/199 |
| 2011/0192935 A1 * | 8/2011 | Schneider | B64D 11/003 244/118.5 |
| 2013/0290221 A1 * | 10/2013 | Jindel | G06Q 10/08 705/500 |
| 2014/0176668 A1 * | 6/2014 | Boucourt | B64D 45/0015 348/36 |
| 2015/0083858 A1 | 3/2015 | Jindel | |
| 2015/0241209 A1 * | 8/2015 | Jouper | B64D 11/003 702/156 |
| 2016/0109280 A1 * | 4/2016 | Tiu | B64D 11/003 702/173 |
| 2016/0229537 A1 * | 8/2016 | Scown | B64F 5/00 |
| 2016/0297523 A1 * | 10/2016 | Walton | B64F 5/10 |
| 2016/0328900 A1 * | 11/2016 | Yong | E05B 65/0092 |
| 2016/0332729 A1 * | 11/2016 | Woicekowski | B64D 45/00 |

* cited by examiner

AIRCRAFT OVERHEAD BIN MONITORING AND ALERT SYSTEM

BACKGROUND

This application claims priority to Indian Patent Application No. 3865/DEL/2015 filed Nov. 26, 2015, the entire contents of which is incorporated herein by reference.

Stowing carry-on items on the overhead bin of an aircraft may be limited by bin space and the size of typical carry-on luggage. Although most airlines limit the number of bags that can be stowed in the bins, some passengers may carry more carry-on items than the allowed. Since carry-on luggage may vary in size, some passengers having over-sized luggage may take more bin space than others. Moreover, bags may be stored on a first come first serve basis, so the passengers boarding in the later (last) boarding group may not have enough space to store their bags in the overhead bin simply because of the order of their boarding the aircraft.

In other instances, passengers may need to check their luggage because other passengers have fit oversized bags in the overhead bin, which may requires later-boarding passengers to check their permissibly-sized luggage with the flight attendant and retrieve their luggage at the arrival gate or the baggage claim.

Flight attendants may not have a complete picture of space availability in all the overhead bins, and may not be aware that a single passenger has taken more than their allotted space in the bin. Flight attendants may open every individual overhead bin in an effort to assist passengers boarding later, to search for space availability to stow their carry-on bags. Pilots and airlines may be affected by the delay take-off.

Some passengers may attempt to fit the over-sized and/or overweight luggage in the overhead bins using force to close the door. This may cause structural damage to the overhead bins, which may also result in delayed takeoff or a cancelled flight if the structural damage is significant. In other instances, if a bin door is improperly closed and it is not noticed by a flight attendant, it may be possible for the overhead bin door latch mechanism to open during the flight, which may allow items to fall from the storage bin. It may not be clear to a flight attendant that a bin door is improperly closed, is overloaded, or remains unlocked or is improperly closed. Moreover, using conventional methods, it may not be feasible for a flight attendant to inspect and monitor the status of all overhead storage bins on the aircraft.

BRIEF DESCRIPTION

In some embodiments, a system for monitoring an overhead storage bin may include a proximity sensor, a load sensor, a latch mechanism sensor, and a controller operatively connected to the proximity sensor, the load sensor and the latch mechanism sensor. The controller may be configured to retrieve proximity data from the proximity sensor indicative of a space status of an overhead storage bin, retrieve load data from the load sensor indicative of a stowage weight status of the overhead storage bin, and retrieve a latch status from the latch mechanism indicative of a latch status of an access door of the overhead storage bin. The controller may be further configured to determine, based on the space status, the weight data, and the latch status, a probability indicative of whether an item stowed in the overhead storage bin may fall from the bin, and output, based on the probability, an indication on an output device configured on an exterior surface of the overhead storage bin.

In other embodiments, a computer-implemented method for monitoring an overhead storage bin may include retrieving via a processor, proximity data from a proximity sensor indicative of a space status of an overhead storage bin, retrieving, via the processor, load data from a load sensor indicative of a stowage weight status of the overhead storage bin, and retrieving, via the processor, a latch status from the latch mechanism indicative of a latch status of an access door of the overhead storage bin. The method may further include determining, via the processor, a probability indicative of whether an item stowed in the overhead storage bin may fall from the bin. In some embodiments the determination may be based on the space status, the weight data, and the latch status. The method may further include outputting, based on the probability, an indication on an output device configured on an exterior surface of the overhead storage bin.

In yet other embodiments, a non-transitory computer-readable storage medium may store executable instructions for performing a method for monitoring an overhead storage bin. The method may include retrieving via a processor, proximity data from a proximity sensor indicative of a space status of an overhead storage bin, retrieving, via the processor, load data from a load sensor indicative of a stowage weight status of the overhead storage bin, and retrieving, via the processor, a latch status from the latch mechanism indicative of a latch status of an access door of the overhead storage bin. The method may further include determining, via the processor, a probability indicative of whether an item stowed in the overhead storage bin may fall from the bin. In some embodiments the determination may be based on the space status, the weight data, and the latch status. The method may further include outputting, based on the probability, an indication on an output device configured on an exterior surface of the overhead storage bin.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
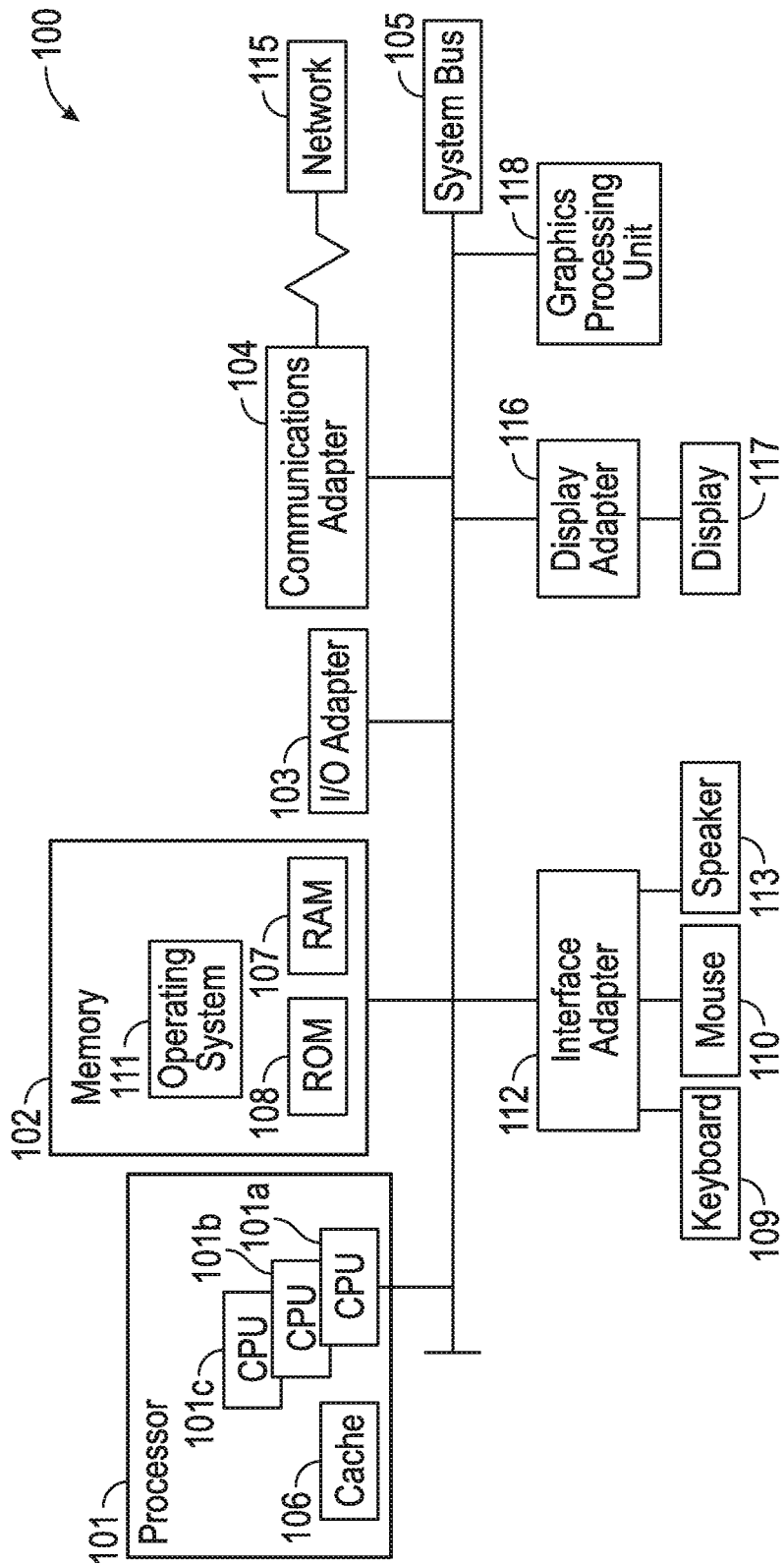
FIG. 1 is a computer system for use in practicing the embodiments described herein.

FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Memory 102 may be operatively coupled to one or more internal or external memory devices. Communications adaptor 104 may be operatively connect computer 100 to one or more networks 115. System bus 105 may also connect one or more user interfaces via interface adaptor 112. Interface adaptor 112 may connect a plurality of user interfaces to computer 100 including, for example, keyboard 109, mouse 110, speaker 113, etc. System bus 105 may also connect display adaptor 116 and display 117 to processor 101. Processor 101 may also be operatively connected to graphical processing unit 118.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), a microprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 111. Operating system 111 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 110. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 115.

Network 115 can be an IP-based network for communication between computer 100 and any external device. Network 115 may transmit and receive data between computer 100 and devices and/or systems external to computer 100. In an exemplary embodiment, network 115 can be a managed IP network administered by a service provider. Network 115 may be a network internal to an aircraft, such as, for example, an avionics network, etc. Network 115 may be implemented in a wireless fashion, e.g., using wireless protocols and technologies, such as WiFi, WiMax, etc. Network 115 may also be a wired network, e.g., an Ethernet network, an ARINC 429 network, a CAN, etc., having any wired connectivity including, e.g., an RS232 connection, RS422 connection, etc. Network 115 can also be a packet-switched network such as a local area network, wide area network, metropolitan area network, Internet network, or other similar type of network environment. The network 115 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 111, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Figure 2:
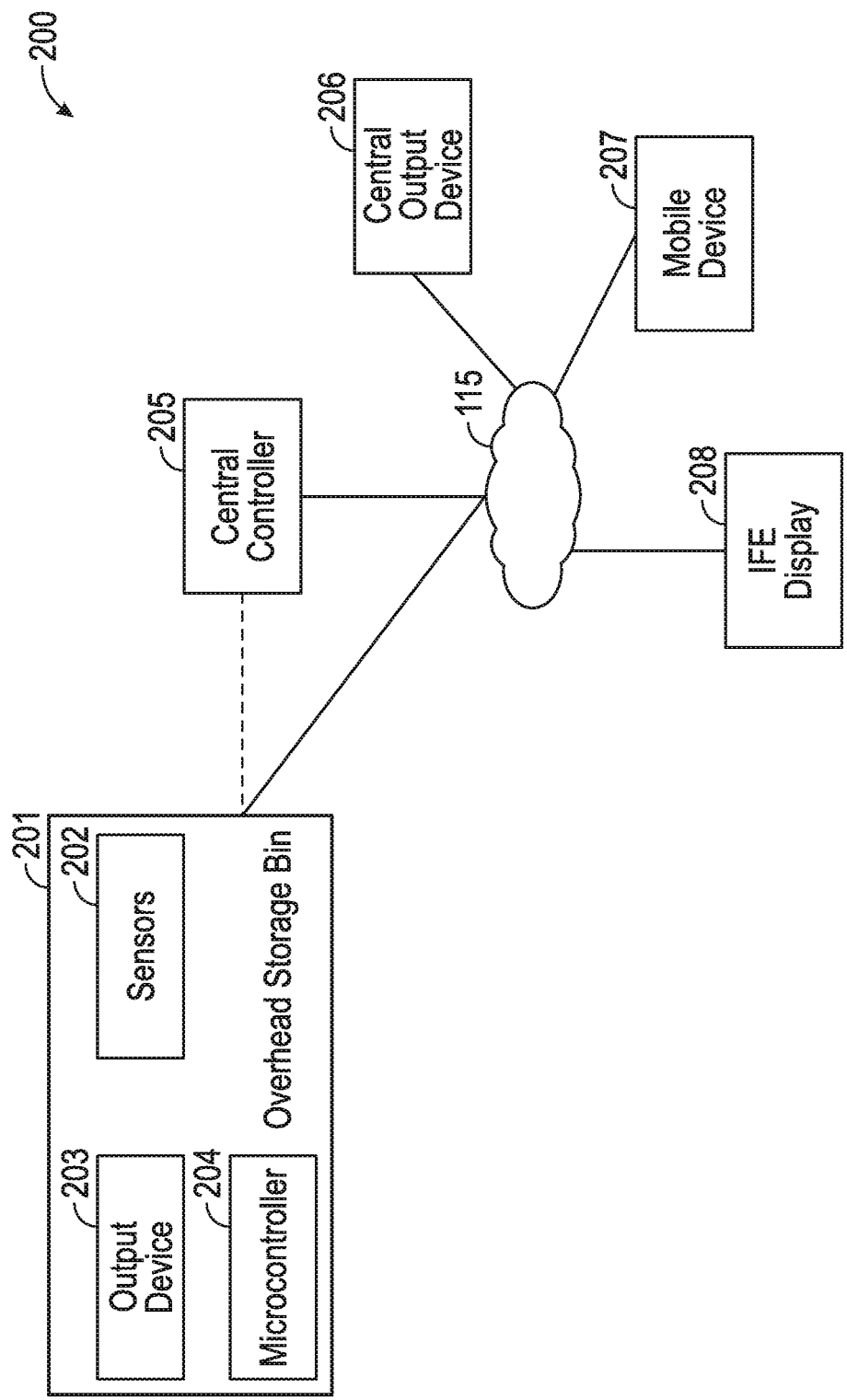
FIG. 2 is a block diagram of a computing environment, in accordance with some embodiments.

Referring now to FIG. 2, a block diagram of a computing environment 200 is depicted, in accordance with some embodiments. In some aspects, computing environment 200 may include one or more overhead storage bins 201 having sensors 202, an output device 203, and a microcontroller 204. Computing environment 200 may further include a central output device 206 operatively connected to central controller 205, and one or more mobile devices 207 in connection with central controller 205, overhead storage bin 201 and/or central output device 206. Computing environment 200 may further include one or more inflight entertainment (IFE) system 208, which may be operatively connected to central controller 205. Devices 201, 205, 206, 207, and 208 may be operatively connected through network 115.

Overhead storage bin 201 may be fixed to an interior structure of an aircraft and may be configured to stow bags, luggage, personal items and/or the like. Overhead storage bin 201 may include any number of sensors 202 including, for example, one or more proximity sensors, one or more load sensors, one or more latch sensors, etc. Sensors 202 may be configured to send and/or receive sensor information to central controller 205 via a microcontroller 204.

Overhead storage bin 201 may also include one or more output devices 203. Output device 203 may include, for example, a digital output device, one or more lights indicative of a status of storage bin 201, and/or an audible speaker configured to sound a warning, a message.

Microcontroller 204 may be configured to communicate with sensors 202 and output device 203, and send and receive data to sensors 202 and output device 203. Microcontroller 204 may also be configured to communicate with central controller 205. For example, microcontroller 204 may receive commands from central controller to retrieve information from sensors 202, forward the information to central controller 205, and output a message via output device 203. Central controller 205 may be, for example, a computer similar to computer 100. Microcontroller 204 may process one or more instructions such as, for example, instructions for calculating a probability of an item falling from overhead storage bin 201 based on retrieved sensor data from sensors 202. In other aspects, central controller 205 may perform some analytical steps described herein, and provide instructions to microcontroller 204 to operate sensors 202 and/or output device 203.

Figure 3:
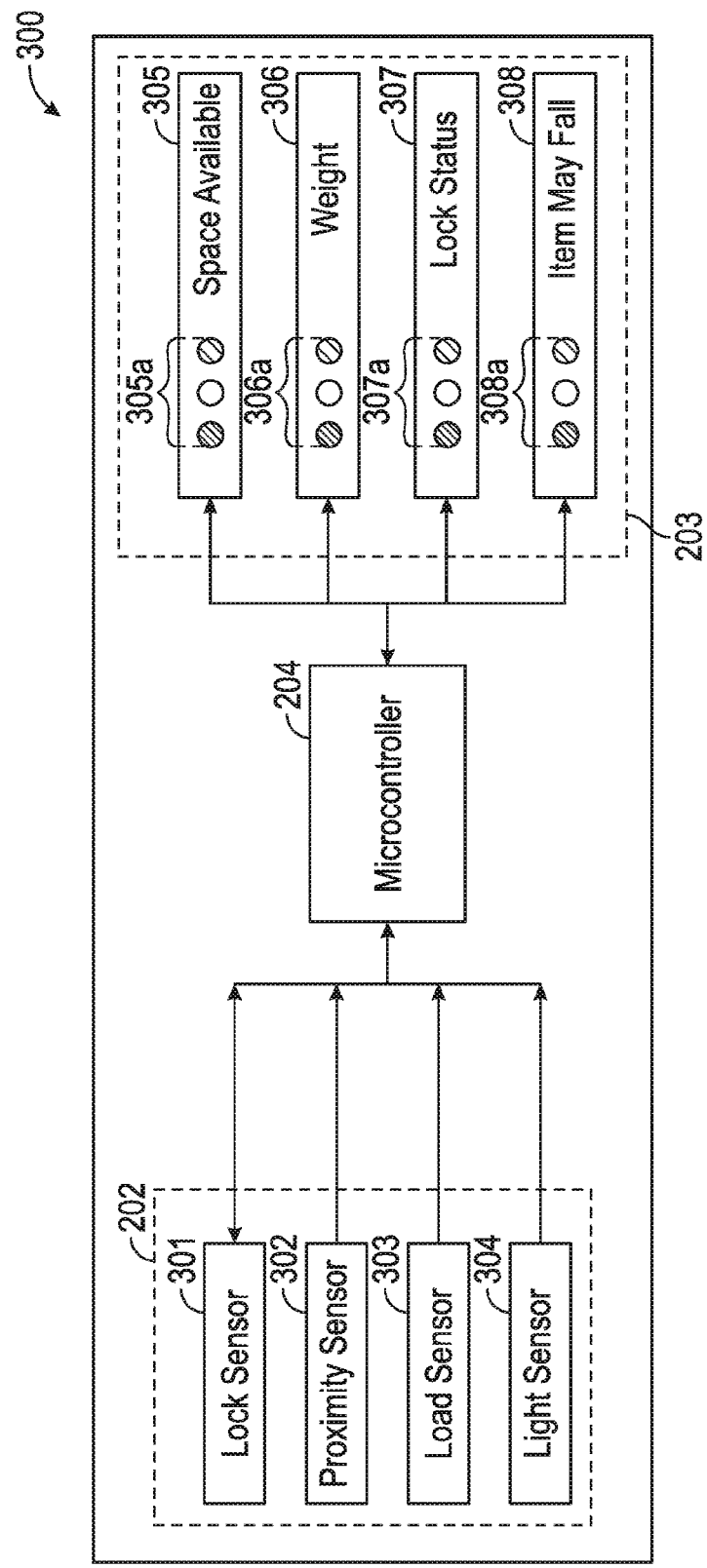
FIG. 3 is a block diagram of a system for monitoring an overhead storage bin, in accordance with some embodiments.

FIG. 3 is a block diagram of a system 300 for monitoring an overhead storage bin, in accordance with some embodiments. System 300 may include sensors 202, microcontroller 204, and output device 203. System 300 may be attached to overhead storage bin 201 or be operatively connected to but separate from overhead storage bin 201.

Sensors 202 may include a plurality of sensor banks 301-304. For example, sensors 202 may include a latch/lock sensor 301, a proximity sensor 302, a load sensor 303, and a light sensor 304. Each of sensors 301-304 may include a single sensor or a bank of sensors, such as a sensor array. In some embodiments, sensors 202 may include a plurality of sensors configured to provide information indicative of a position of an object, movement of an object, weight of an object, information indicative of whether an overhead storage bin door is open, whether overhead storage bin 201 is overloaded, under-loaded, and/or data useful for making other determinations.

Figure 6:
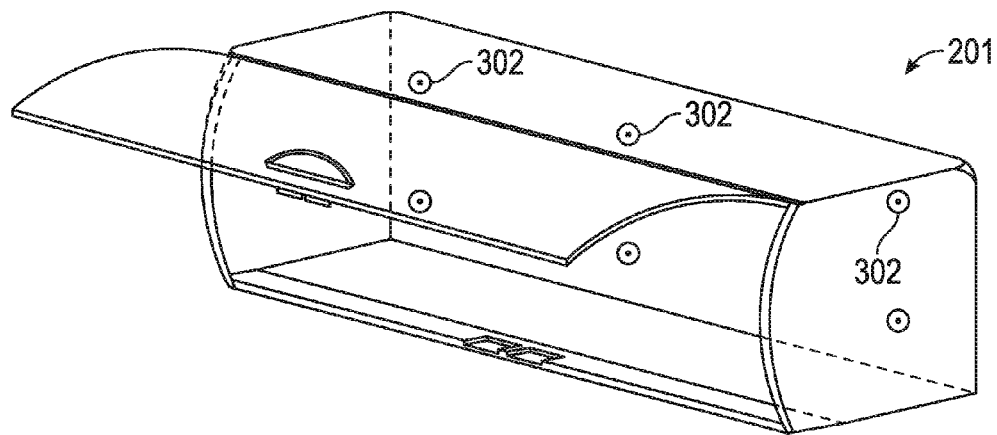
FIG. 6 is a depiction of an overhead storage bin having a plurality of proximity sensors according to some embodiments.
Figure 7:
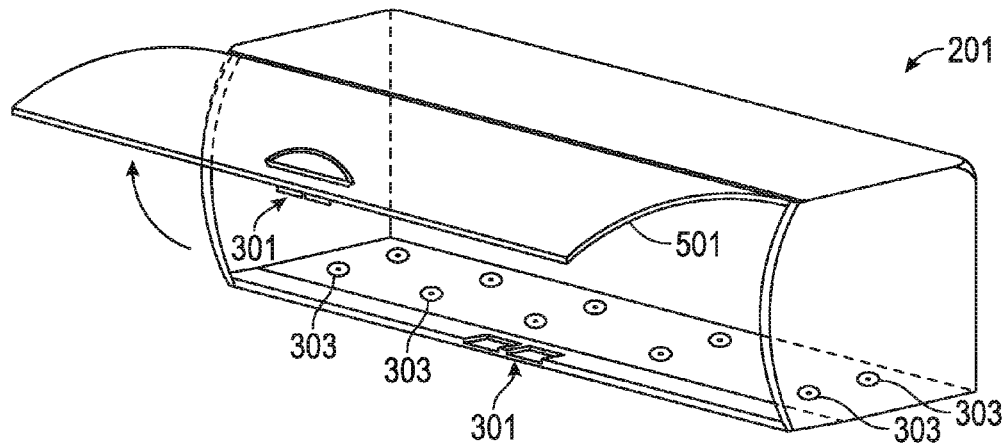
FIG. 7 is a depiction of an overhead storage bin including load sensors and latch/lock sensors according to some embodiments.

Load sensor 303 may include a plurality of load sensors configured in an array (as depicted with respect to FIG. 7) and may be configured to determine a weight and relative weight distribution with respect to the array of load sensors. In other aspects, proximity sensor 302 may include a plurality of proximity sensors (as depicted with respect to FIGS. 5-6) and may be configured to determine the proximity of an object stored inside of overhead storage bin 201. Lock sensor 301, as depicted in FIG. 7, may include a plurality of sensors configured to determine an actuation state of one or more locks, latches, etc. For example, if a lock or latch is operative and configured correctly (e.g., latched and/or locked), lock sensor may determine the operative state of the lock and/or latch. In some aspects, microcontroller may provide a lock and/or unlock command to lock censor 301.

Output device 203 may include an output device 203 configured to output a status for each of the plurality of sensors 202. For example, output device 203 may include a space status output 305, a weight status output 306, a latch status output 307, and a fall probability indicator 308. For example, in some aspects, microcontroller 204 may determine, based on sensor information retrieved from light sensor 304 and/or proximity sensor 302, whether there is available storage space in overhead storage bin 201. Microcontroller 204 may output a status of available space for stowage inside of overhead storage bin 201.

Microcontroller 204 may determine, based on sensor information received from load sensor 303, a stowage weight status that may indicate whether overhead storage bin 201 is under loaded, overloaded, etc. A weight status output 306 may receive data from microcontroller 204 and indicate a stowage weight status of overhead storage bin 201.

Latch status output 307 may indicate whether a lock or latch of overhead storage bin 201 is in a safe and/or operative position. The output status for all outputs 305-308 may be output via one or more lights, e.g., indicator lights 305a, 306a, 307a, and 308a. Microcontroller 204 may indicate an output status via other means not shown, such as, for example, a digital display, an output speaker, and/or an audible alarm, etc.

Weight status output 306 may be indicative of a stowage weight status of overhead storage bin 201. For example, microcontroller 204 may retrieve load sensor data from load sensor 303 indicative of a weight of one or more items stowed in overhead storage bin 201. Microcontroller 204 may determine a stowage weight status of overhead storage bin 201 based on the data, and output an indication of the status via weight status output 306. Microcontroller 204 may output the status via indicator lights 306a. A weight status may be indicative of overloading or under-loading of overhead storage bin 201.

Latch status output 307 may be configured to output a safety status of an access door of overhead storage bin 201. For example, microcontroller 204 may access lock sensor 301, determine whether the latch and/or lock is in a safe position with respect to the travel of the aircraft (e.g., the aircraft is preparing for takeoff, in flight, preparing for a landing, etc.), and output the status via lock status output 307.

Fall probability indicator 308 may indicate whether an item stowed in overhead stowage bin 201 has a high probability of falling out of the bin. For example, microcontroller 204 may access proximity sensor 302, lock sensor, 301, load sensor 303, and light sensor 304, determine, based on the information from sensors 301-304 whether an item stowed in overhead storage bin 201 may fall, and output the indication via output indicator lights 308*a*.

All of indicator lights 305*a*-308*a* may be configured with a plurality of colors, each of which indicating a relative strength of the warning, probability, etc. For example, a red light may indicate a strong warning status, a yellow may indicate a medium status, and a green light may indicate a safe or operative status.

Figure 4:
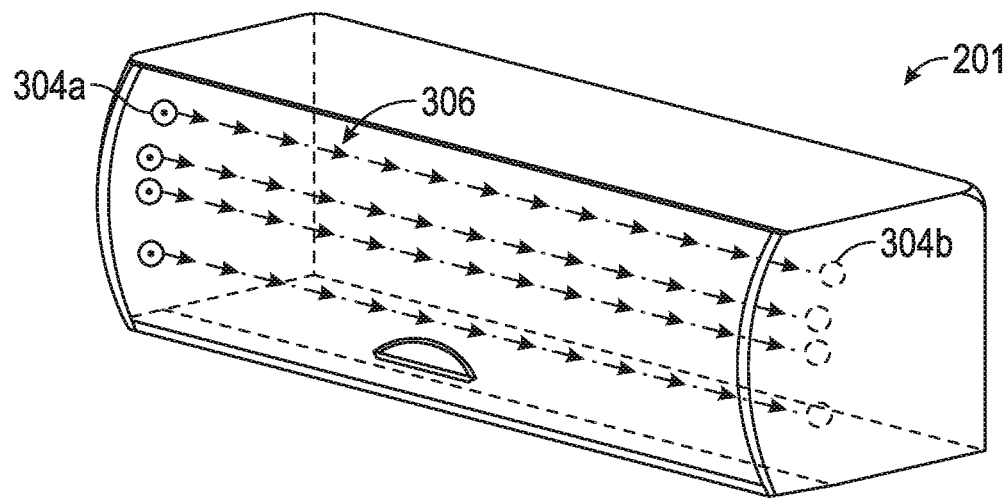
FIG. 4 is an overhead storage bin having a plurality of light sensors, in accordance with some embodiments.

Referring now to FIG. 4, an overhead storage bin 201 is depicted having a plurality of light sensors 304, in accordance with some embodiments. Light sensors 304 and light sources 305 may be configured on the inner wall of overhead storage bin 201. In some embodiments, one or more light sensors 304 and a one or more light sources 305 may be arranged in a straight line between source 305 and sensor 304 such that that a light beam 306 from light source 305 may be sensed by the one or more light sensors 304. In case any objects from the overhead storage bin 201 rests on access door 501 due to disturbance then the light beam from the light source 305 is obstructed by the object and no light beam is sensed by the light sensor 304. In some aspects, microcontroller 204 may convolute the light obstruction data along with weight information and weight distribution to determine the probability of items falling from the bin.

In other aspects, overhead storage bin 201 may include one or more light sensors 304 that may be configured to determine movement, proximity and/or position of items stored in overhead storage bin 201. For example, light sensors 304 may provide information indicative of a disturbance in the stowage during the flight which might in a higher probability of items falling from overhead storage bin 201. Microcontroller 204 may determine, based on the space status, the weight data, and the latch status, a probability indicative of whether an item stowed in the overhead storage bin may fall from the bin. Microcontroller 204 may output an alert to alert the passenger to open the bin door with care. In some embodiments, microcontroller 204 may also output an alert status in another display, such as, for example inflight entertainment (IFE) system 208. In some aspects, a displayed message may alert passengers seated below the particular overhead bin to fix the items in the overhead bin before items fall from the bin.

Light sensors 304 may be configured on the inner wall of overhead storage bin 201. Light sensors 304 may be arranged in a linear arrangement (having a light source 305 aligned linearly with a light sensor 304), which may be used to determine a probability of an item falling from overhead storage bin 201.

Figure 5:
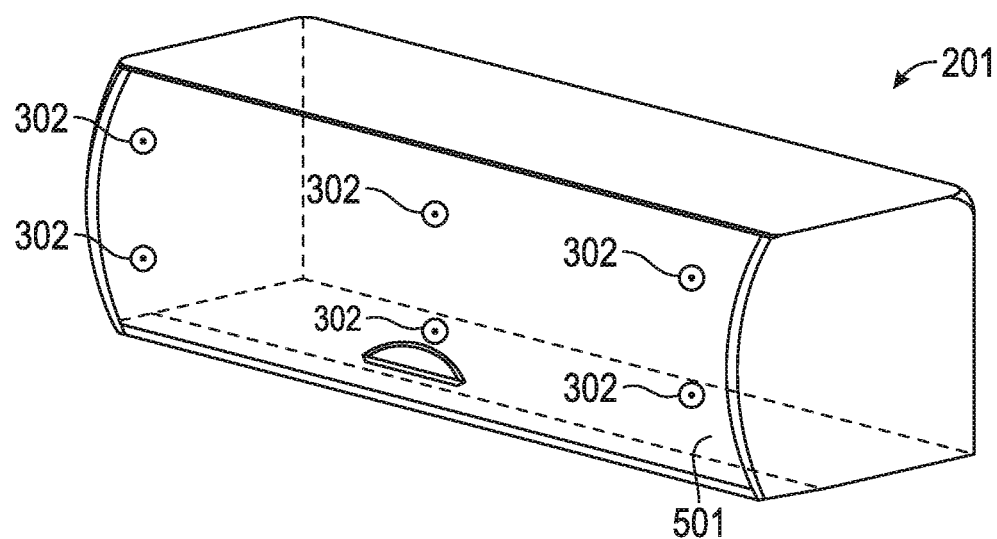
FIG. 5 is a depiction of an overhead storage bin having a plurality of proximity sensors according to some embodiments.

FIG. 5 depicts overhead storage bin 201 having a plurality of proximity sensors 302 configured to determine a space status of overhead storage bin 201. Sensors 302 may be further configured to provide information indicative of position of an item. Positional information may be indicative of whether an item stowed in overhead storage bin 201 may fall from the bin.

Although FIG. 5 depicts sensors 302 configured on an access door 501 of overhead storage bin 201, it is appreciated that sensors 302 may be configured in a number of different ways in order to determine positional and proximity information of items in overhead storage bin 201. For example, FIG. 6 depicts overhead storage bin 201 having proximity sensors 302 configured on a back surface of overhead storage bin 201 for sensing space availability and for sensing unsafe shifting of contents.

As depicted in FIG. 7, overhead storage bin 201 may include an access door 501 that may be opened and closed via a latch and/or lock. Overhead storage bin 201 may also include one or more load sensors 303 configured for determining position and weight of objects, and one or more latch/lock sensors 301 configured for determining whether the latch and/or lock of overhead storage bin 201 are safely configured. Load sensors 303 may be configured as a single sensor or a plurality of sensors distributed across the bottom of overhead storage bin 201. Latch/lock sensor 301 may be configured to sense a latch status of access door 501.

Figure 8:
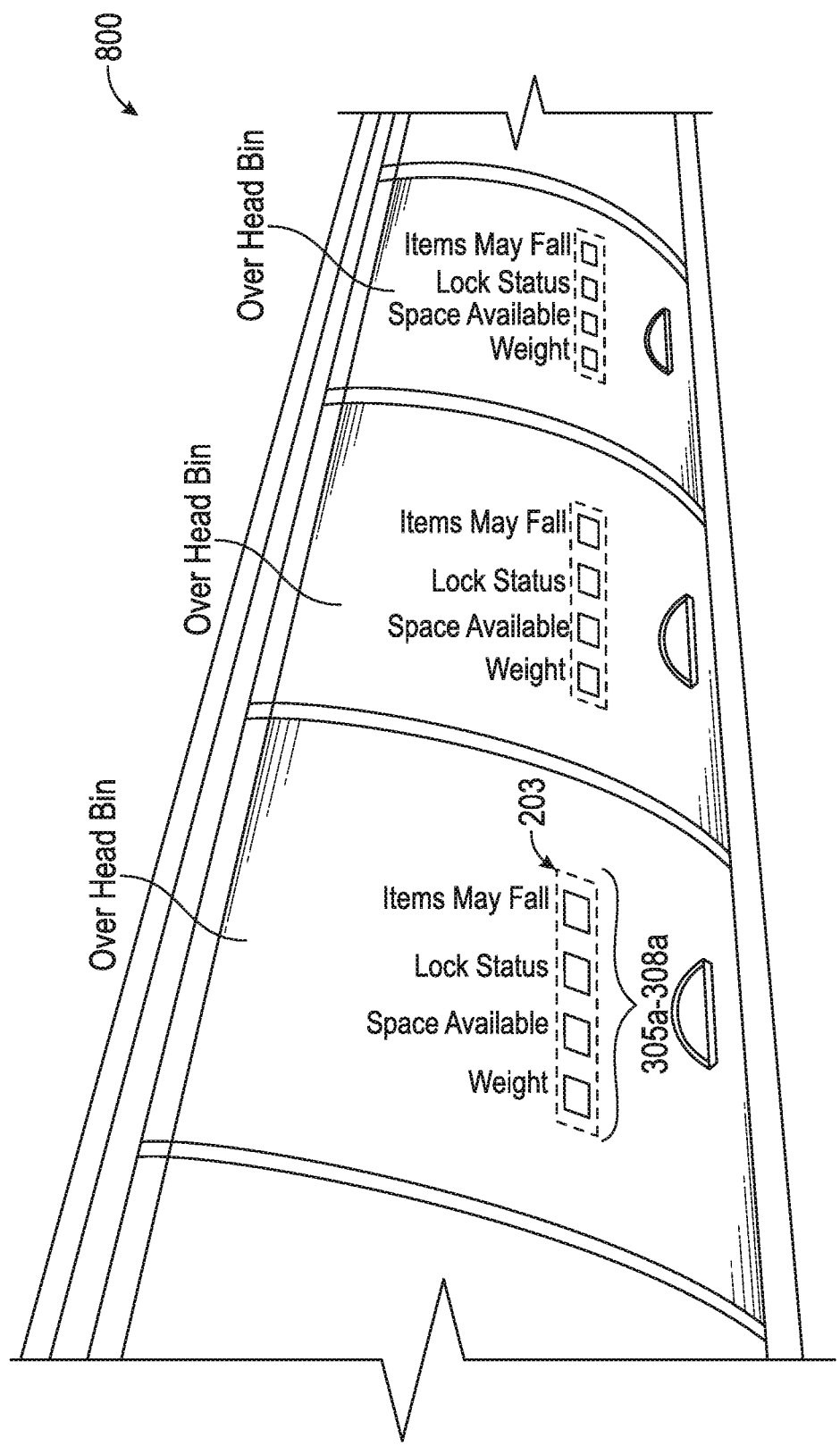
FIG. 8 depicts a plurality of overhead storage bins in accordance with some embodiments.

Referring now to FIG. 8, a plurality of overhead storage bins 800 is depicted according to some embodiments. Overhead storage bins 800 are shown with output devices 305*a*-308*a*, which may indicate a respective status of each overhead storage bin. For example, in some aspects, central controller 205 may be operatively connected to the plurality of overhead storage bins 800. Central controller 205 may centrally monitor bins 800 by connecting to the microcontrollers associated with each of the bins (e.g., microcontroller 204), accessing sensor data, and using the sensor data to determine one or more statuses of the overhead storage bins.

In some aspects, central controller 205 may determine, based on sensor data, whether an item is likely to fall from any one of overhead storage bins 800, and output the information to a central output device 206, which may be located in a location on the aircraft viewable by aircraft personnel (e.g., a flight attendant, a captain, etc.). In some aspects, central controller 205 may output information indicative of space status, weight status, latch/lock status, falling hazard, etc., for each of the plurality of stowage bins 800.

Figure 9:
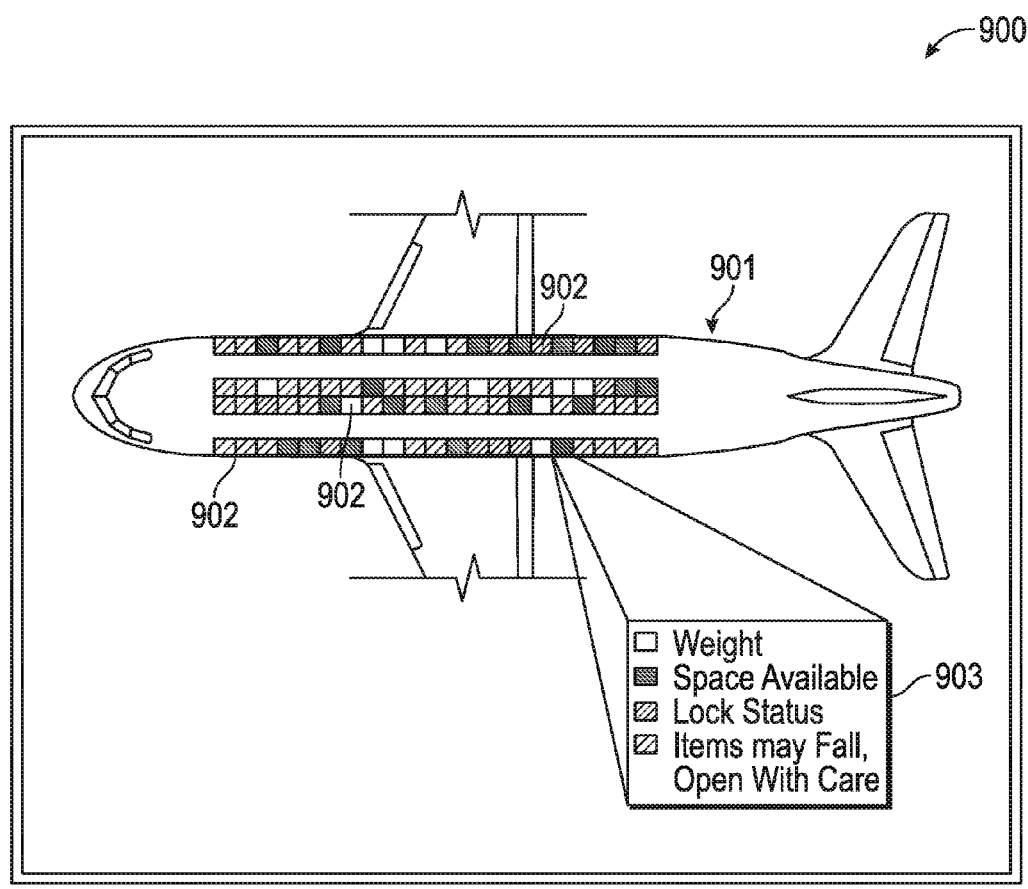
FIG. 9 depicts a user interface for a system for monitoring an overhead rage bin in accordance with some embodiments.

FIG. 9 depicts one embodiment of a user interface of a system for monitoring an overhead storage bin 201, in accordance with some embodiments. Referring now to FIG. 9, interface 900 may include a depiction of an aircraft 901, with a corresponding status 902 for each of the plurality of overhead storage bins 800. In some aspects, central controller 205 may retrieve proximity data, weight data, and a latch status from a plurality of overhead storage bins 800 connected to central controller 205. Central controller 205 may then determine, for each of the plurality of overhead storage bins 800, a hazard status indicative of whether an item stowed in the overhead storage bins may fall from the bin. In some aspects central controller 205 may output the hazard status for each of the plurality of overhead storage bins 800 on an output device of each of the plurality of overhead storage bins 800 (e.g., on output device 203 associated with each bin). The hazard status may be indicative of whether an item stowed in the respective overhead storage bin may fall from the bin.

In other aspects, central controller 205 may also output the hazard status 902 on a central output device 206. Central output device 206 may output user interface 900 as depicted in FIG. 9, which may indicate hazard statuses for the bins 800. For example, interface 900 may include a color code 903 indicating the particular status for each overhead storage bin. Mobile device 207 may also receive transmission from central output device 206, and output user interface 900. For example, mobile device 207 may be a tablet or handheld device used by a flight attendant. In other embodiments, mobile device 207 may be a handheld device of a passenger.

Figure 10:
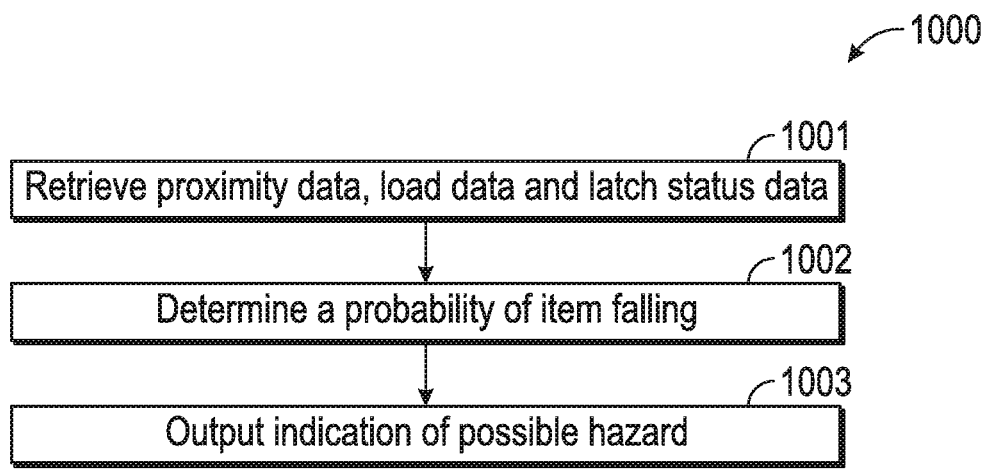
FIG. 10 is a flow diagram for a method for monitoring an overhead storage bin in accordance with some embodiments.

Referring now to FIG. 10, a method for monitoring an overhead storage bin is depicted, according to some embodiments. At step 1001, central controller 205 may retrieve proximity data, load data, and latch status data from overhead storage bin 201. At step 1002, central controller 205 may determine, based on the space status, weight data, and the latch status, a probability indicative of whether an item stowed in the overhead storage bin 201 may fall. In some aspects, central controller 205 may output, based on the probability, an indication on an output device (e.g., output device 203) configured on an exterior surface of overhead storage bin 201. Output device 203, central output device 206, IFE display 208, mobile device 207, and/or any combination thereof may display the indication. Output device 203 may also output information with respect to each individual status (e.g., the space available, the weight loading, and/or the lock status).

Figure 11:
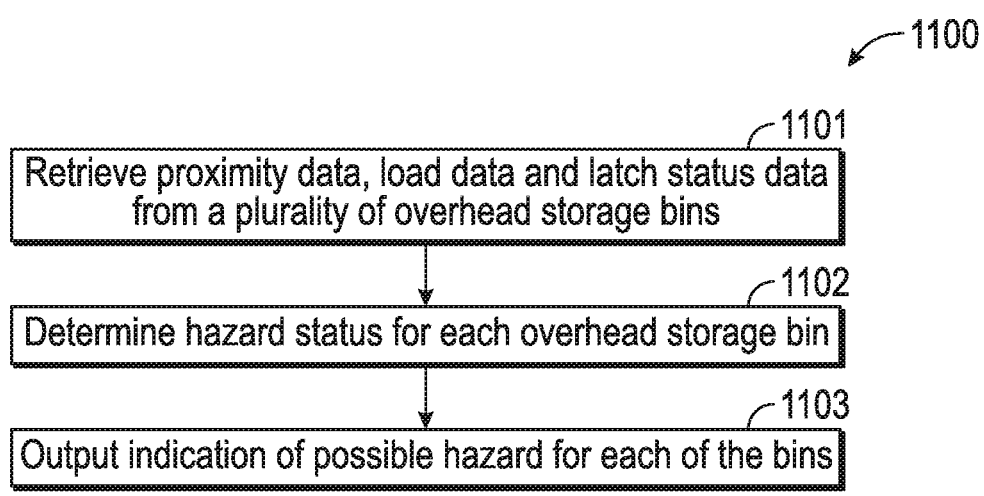
FIG. 11 is a flow diagram for a method for monitoring a plurality of overhead storage bins in accordance with some embodiments.

Referring now to FIG. 11, a flow diagram for a method 1100 for monitoring a plurality of overhead storage bins is described, according to some embodiments. In some aspects, central controller 205 may retrieve proximity data, weight data, and a latch status from a plurality of overhead storage bins 800 connected to the central controller 205. In some aspects, controller 205 may determine, for each of the plurality of overhead storage bins 800, a hazard status indicative of whether an item stowed in the overhead storage bins may fall from the bin. In some embodiments central controller 205 may output the hazard status for each of the plurality of overhead storage bins 800, on an output device 203 of each of the plurality of overhead storage bins 800, where the hazard status is indicative of whether an item stowed in the respective overhead storage bin may fall from the bin. Output device 203, central output device 206, mobile device 207, IFE display 208, and/or any combination thereof may display the indication.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A system for monitoring an overhead storage bin comprising:
   a proximity sensor, a load sensor, and a latch mechanism sensor; and
   a controller operatively connected to the proximity sensor, the load sensor and the latch mechanism sensor, the controller configured to:
      retrieve proximity data from the proximity sensor indicative of a space status of an overhead storage bin;
      retrieve load data from the load sensor indicative of a stowage weight status of the overhead storage bin;
      retrieve a latch status from the latch mechanism indicative of a latch status of an access door of the overhead storage bin;
      determine, based on the space status, the weight data, and the latch status, a probability indicative of whether an item stowed in the overhead storage bin may fall from the bin;
      output, based on the probability, an indication on an output device configured on an exterior surface of the overhead storage bin.

2. The system of claim 1, wherein the controller is further configured to:
   retrieve proximity data, weight data, and a latch status from a plurality of overhead storage bins connected to the controller;
   determine, for each of the plurality of overhead storage bins, a hazard status indicative of whether an item stowed in the overhead storage bins may fall from the bin; and
   output the hazard status for each of the plurality of overhead storage bins, on an output device of each of the plurality of overhead storage bins, wherein the hazard status is indicative of whether an item stowed in the respective overhead storage bin may fall from the bin.

3. The system of claim 2, wherein the controller is further configured to output, to an operatively connected display device, data indicative of a space status, a load status, a latch status, and the fall indication for each of the plurality of overhead storage bins.

4. The system of claim 1, wherein the proximity sensor is a sensor bank comprising a plurality of sensors configured to determine whether a stowed item is proximate to the access door.

5. The system of claim 1, wherein the latch mechanism sensor comprises at least one sensor configured to determine whether the latch is in a fully latched position.

6. The system of claim 1, wherein the load sensor comprises an array of load sensors configured on a base of the overhead storage bin.

7. The system of claim 6, wherein the load data comprises a load distribution with respect to the array of load sensors.

8. The system of claim 7, wherein the controller is configured to selectively output an indication of the load distribution for each of the plurality of overhead storage bins.

9. A computer-implemented method for monitoring an overhead storage bin comprising:
   retrieving via a processor, proximity data from a proximity sensor indicative of a space status of an overhead storage bin;
   retrieving, via the processor, load data from a load sensor indicative of a stowage weight status of the overhead storage bin;
   retrieving, via the processor, a latch status from the latch mechanism indicative of a latch status of an access door of the overhead storage bin;
   determining, via the processor, a probability indicative of whether an item stowed in the overhead storage bin may fall from the bin, the determination based on the space status, the weight data, and the latch status; and
   outputting, based on the probability, an indication on an output device configured on an exterior surface of the overhead storage bin.

10. The method of claim 9, further comprising:
    retrieving, via the processor, proximity data, weight data, and latch status from a plurality of overhead storage bins connected to the controller;
    determining, for each of the plurality of storage bins, a hazard status indicative of whether an item stowed in the overhead storage bins may fall from the bin; and
    outputting the hazard status for each of the plurality of overhead storage bins, on an output device of each of the plurality of overhead storage bins, indicative of whether an item stowed in the respective overhead storage bin may fall from the bin.

11. The method of claim 10, wherein the controller is further comprising outputting, to an operatively connected display device, data indicative of a space status, a load status, a latch status, and the fall indication for each of the plurality of overhead storage bins.

12. The method of claim 9, wherein the proximity sensor is a sensor bank comprising a plurality of sensors configured to determine whether a stowed item is proximate to the access door.

13. The method of claim 9, wherein the latch mechanism sensor comprises at least one sensor configured to determine whether the latch is in a fully latched position.

14. The system of claim 9, wherein the load sensor comprises an array of load sensors configured on a base of the overhead storage bin.

15. The system of claim 14, wherein the load data comprises a load distribution with respect to the array of load sensors.

16. The system of claim 15, wherein the controller is configured to selectively output an indication of the load distribution for each of the plurality of overhead storage bins.

17. A non-transitory computer-readable storage medium storing executable instructions for performing a method for monitoring an overhead storage bin, the method comprising:
retrieving via a processor, proximity data from a proximity sensor indicative of a space status of an overhead storage bin;
retrieving, via the processor, load data from a load sensor indicative of a stowage weight of the overhead storage bin;
retrieving, via the processor, a latch status from the latch mechanism indicative of a latch status of an access door of the overhead storage bin;
determining, via the processor, a probability indicative of whether an item stowed in the overhead storage bin may fall from the bin, the determination based on the space status, the weight data, and the latch status; and
outputting, based on the probability, an indication on an output device configured on an exterior surface of the overhead storage bin.

18. The non-transitory computer-readable storage medium of claim 17, further comprising:
retrieving, via the processor, proximity data, weight data, and latch status from a plurality of storage bins connected to the controller;
determining, for each of the plurality of storage bins, a hazard status indicative of whether an item stowed in the overhead storage bins may fall from the bin; and
outputting the hazard status for each of the plurality of overhead storage bins, on an output device of each of the plurality of overhead storage bins, indicative of whether an item stowed in the respective overhead storage bin may fall from the bin.

19. The non-transitory computer-readable storage medium of 18, further comprising outputting, to an operatively connected display device, data indicative of a space status, a load status, a latch status, and the fall indication for each of the plurality of overhead storage bins.

20. The non-transitory computer-readable storage medium of claim 17, wherein the proximity sensor is a sensor bank comprising a plurality of sensors configured to determine whether a stowed item is proximate to the access door.

* * * * *